US012595856B2

(12) United States Patent
Xu

(10) Patent No.: US 12,595,856 B2
(45) Date of Patent: Apr. 7, 2026

(54) ONE-TO-FOUR SOLENOID VALVE TUBE CONTROL STRUCTURE

(71) Applicant: Ningbo Hanci Electrical Co., Ltd., Ningbo (CN)

(72) Inventor: Kaijing Xu, Ningbo (CN)

( * ) Notice: Subject to any disclaimer, the term of this patent is extended or adjusted under 35 U.S.C. 154(b) by 84 days.

(21) Appl. No.: 18/758,814

(22) Filed: Jun. 28, 2024

(65) Prior Publication Data

US 2025/0230879 A1     Jul. 17, 2025

(30) Foreign Application Priority Data

Jan. 15, 2024    (CN) .......................... 202420097376.8

(51) Int. Cl.
*F16K 11/22* (2006.01)
*F16K 11/24* (2006.01)
*F16K 27/02* (2006.01)
*F16K 31/06* (2006.01)

(52) U.S. Cl.
CPC .............. *F16K 11/22* (2013.01); *F16K 11/24* (2013.01); *F16K 27/029* (2013.01); *F16K 31/0603* (2013.01); *Y10T 137/87877* (2015.04)

(58) Field of Classification Search
CPC ........ F16K 11/22; F16K 11/24; F16K 27/029; F16K 27/02; F16K 27/00; F16K 31/0603; Y10T 137/87877
See application file for complete search history.

(56) References Cited

U.S. PATENT DOCUMENTS

| | | | | | |
|---|---|---|---|---|---|
| 2,598,961 | A | * | 6/1952 | Andrus | A01G 25/02 |
| | | | | | 239/562 |
| 3,459,221 | A | * | 8/1969 | Axelrod | F16K 11/22 |
| | | | | | 137/886 |
| 3,480,040 | A | * | 11/1969 | Erickson | F16K 11/24 |
| | | | | | 251/120 |
| 4,241,761 | A | * | 12/1980 | Miller | F16K 41/103 |
| | | | | | 137/884 |
| 5,273,075 | A | * | 12/1993 | Skaer | F16K 7/16 |
| | | | | | 137/886 |
| 6,032,690 | A | * | 3/2000 | Weissfloch | F16K 7/126 |
| | | | | | 137/599.08 |

(Continued)

FOREIGN PATENT DOCUMENTS

| | | | | | |
|---|---|---|---|---|---|
| CN | 106090332 | A | * | 11/2016 | ......... F16K 31/0634 |
| CN | 219013457 | U | * | 5/2023 | |

(Continued)

*Primary Examiner* — David Colon-Morales

(57) ABSTRACT

One-to-four solenoid valve tube control structure, comprising a five-way pipe, wherein the five-way pipe comprises a water inlet pipe, first water outlets provided on both sides of one end of the water inlet pipe, and water distribution pipes provided on both sides of the water inlet pipe; the water distribution pipe is located above the first water outlet, and a top of the first water outlet is provided with a valve cavity eccentrically arranged therewith; an inside of the water inlet pipe is provided with a separating rib. The water inlet pipe is directly connected to the two first water outlets, which maximizes the use of the five-way pipe body space, meets the daily use needs of users, reduces the size of the product, saves mold and production costs, and the separating rib separates the water flow into two streams.

9 Claims, 5 Drawing Sheets

(56)  References Cited

U.S. PATENT DOCUMENTS

| 6,058,975 | A | * | 5/2000 | Hui-Chen | F16K 11/20 |
| | | | | | 285/133.4 |
| 6,321,782 | B1 | * | 11/2001 | Hollister | F17C 13/025 |
| | | | | | 137/557 |
| 6,631,736 | B2 | * | 10/2003 | Seitz | F15B 13/0857 |
| | | | | | 137/884 |
| 7,216,672 | B1 | * | 5/2007 | Chen | F16L 41/16 |
| | | | | | 251/149.8 |
| 7,243,684 | B1 | * | 7/2007 | Chen | F16K 15/18 |
| | | | | | 251/149.8 |
| 9,038,665 | B2 | * | 5/2015 | Cheng | F16K 11/24 |
| | | | | | 137/883 |
| 9,206,919 | B2 | * | 12/2015 | Neumeister | F16K 27/02 |
| 9,371,947 | B2 | * | 6/2016 | Choi | F16L 37/0927 |
| 9,581,264 | B1 | * | 2/2017 | Ericksen | F16K 27/003 |
| 9,605,373 | B2 | * | 3/2017 | Hwang | D06F 39/028 |
| 9,795,095 | B2 | * | 10/2017 | Franchini | F16K 11/24 |
| 9,936,653 | B2 | * | 4/2018 | Antel | G05B 11/01 |
| 10,465,818 | B2 | * | 11/2019 | Lo | F16K 5/0442 |
| 10,508,753 | B2 | * | 12/2019 | Ravedati | F16K 37/005 |
| 10,864,990 | B2 | * | 12/2020 | Beard | A47J 31/469 |
| 11,118,696 | B2 | * | 9/2021 | Ye | F16K 11/22 |
| 11,686,399 | B1 | * | 6/2023 | Chen | A01G 25/162 |
| | | | | | 137/625 |
| 12,066,116 | B2 | * | 8/2024 | Cole | F16K 31/0655 |
| 12,140,235 | B2 | * | 11/2024 | Grimm | F16K 11/22 |
| 2003/0102039 | A1 | * | 6/2003 | Marzorati | F16K 27/003 |
| | | | | | 137/883 |
| 2014/0311589 | A1 | * | 10/2014 | Eley | F16K 5/0626 |
| | | | | | 137/315.2 |
| 2020/0284004 | A1 | * | 9/2020 | Levitt | E03C 1/052 |
| 2021/0332896 | A1 | * | 10/2021 | Chen | F16K 5/0414 |
| 2021/0341063 | A1 | * | 11/2021 | Chen | F16K 27/065 |

FOREIGN PATENT DOCUMENTS

| DE | 202019104773 | U1 | * | 9/2019 | F16K 27/003 |
| DE | 202019104774 | U1 | * | 9/2019 | F16K 31/44 |

* cited by examiner

ONE-TO-FOUR SOLENOID VALVE TUBE CONTROL STRUCTURE

TECHNICAL FIELD

The invention relates to the technical field of valves, in particular to a one-to-four solenoid valve tube control structure.

BACKGROUND ART

The irrigation timing valve has at least one water inlet for water flow in and at least one water outlet for water flow out. A solenoid valve is arranged on the flow channel between the water inlet and the water outlet. The opening and closing of the solenoid valve is controlled by the control circuit. The user can adjust the relevant parameters in the control circuit to achieve the function of timed irrigation.

The public patent (publication number CN219013457U) discloses a pipe connection structure and an irrigation timing valve used therein. The four-way pipe only has the first flow channel and the fourth flow channel. When a water outlet is required, only the first water outlet pipe and the second water outlet pipe can be externally connected. The spatial layout on the four-way pipe is unreasonable: the first flow channel and the fourth flow channel are concentrically opposite to each other, and the water hammer has a large impact on the third solenoid valve, which affects the strength of the four-way structure and the use effect is not ideal.

SUMMARY OF THE INVENTION

The invention provides a one-to-four solenoid valve tube control structure to solve the problems in the background technology.

In order to achieve the above purpose, the invention provides the following technical solutions: a one-to-four solenoid valve tube control structure, comprising a five-way pipe, wherein the five-way pipe comprises a water inlet pipe, first water outlets provided on both sides of one end of the water inlet pipe, and water distribution pipes provided on both sides of the water inlet pipe; the water distribution pipe is located above the first water outlet, and a top of the first water outlet is provided with a valve cavity eccentrically arranged therewith; an inside of the water inlet pipe is provided with a separating rib for separating the water distribution pipes and the valve cavities on both sides of the water inlet pipe; one end of the water distribution pipe away from the water inlet pipe is connected with a water outlet joint.

Further, the water inlet pipe is provided with a flattening part, and the number of the flattening part is at least one.

Further, a top and bottom of the water distribution pipe are respectively provided with a first connecting plate and a second connecting plate, and the first connecting plate and the second connecting plate are both provided with a first connecting hole inside.

Further, the first connecting plate is provided with a first reinforcing rib with one end fixed to the water inlet pipe and a second reinforcing rib with one end fixed to the water distribution pipe.

Further, the second connecting plate is provided with a third reinforcing rib with one end fixed to the valve cavity.

Further, both a top of the water outlet joint and the valve cavity are provided with a solenoid valve, and the bottom of the water outlet joint is provided with a second water outlet.

Further, a top and bottom of one side of the water outlet joint are respectively provided with a first butt joint plate and a second butt joint plate, and one end of the first butt joint plate and the second butt joint plate respectively extend to one side of the first connecting plate and second the connecting plate.

Further, the first butt joint plate and the second butt joint plate are both provided with a second connecting hole; the second connecting hole is coaxially arranged with the first connecting hole on one side thereof, and a fastener is jointly threaded inside the second connection hole and the coaxial first connection hole.

Further, one end of the first connecting plate and the second connecting plate are respectively provided with protrusions facing in opposite directions, and the interiors of the first butt joint plate and the second butt joint plate are respectively provided with grooves facing in opposite directions; one end of the protrusion is buckled into the interior of the corresponding groove.

Compared with the prior art, the invention provides a one-to-four solenoid valve tube control structure, which has the following beneficial effects.

1. In the one-to-four solenoid valve tube control structure, the water inlet pipe is directly connected to the two first water outlets, which maximizes the use of the five-way pipe body space, meets the daily use needs of users, reduces the size of the product, saves mold and production costs, and the separating rib separates the water flow into two streams to reduce the influence of the water flow on the pipelines on both sides of the water inlet pipe. The water distribution pipe is located above the first water outlet, and with the separating rib, it can effectively reduce the impact of the water flow on the middle solenoid valve and the mutual influence. The two first water outlets are eccentric in opposite directions, which greatly increases the installation space on the two first water outlets.

2. In the one-to-four solenoid valve tube control structure, the flattened parts on both sides of the water inlet pipe are conducive to the installation of the internal structure, making the overall thickness of the product thinner, making it easier for customers to operate and install, and more conducive to installation close to the wall or in a small space, making the installation easier.

In the figures: 1 refers to the five-way pipe; 11 refers to the water inlet pipe; 111 refers to the separating rib; 112 refers to the flattening part; 12 refers to the first water outlet; 13 refers to the water distribution pipe; 14 refers to the valve cavity; 15 refers to the first connecting plate; 151 refers to the first reinforcing rib; 152 refers to the second reinforcing rib; 16 refers to the second connecting plate; 161 refers to the third reinforcing rib; 17 refers to the first connecting hole; 18 refers to the protrusion; 2 refers to the water outlet joint; 21 refers to the second water outlet; 22 refers to the first butt joint plate; 23 refers to the second butt joint plate; 24 refers to the second connecting hole; 25 refers to the groove; 26 refers to the fastener; 3 refers to the solenoid valve.

SPECIFIC EMBODIMENT OF THE INVENTION

The technical solutions in the embodiments of the invention will be clearly and completely described hereinafter with reference to the drawings in the embodiments of the invention. Obviously, the described embodiments are only a part of the embodiments of the invention, rather than all the embodiments. Based on the embodiments of the invention, all other embodiments obtained by those of ordinary skill in the art without creative efforts shall fall within the protection scope of the invention.

Figure 1:
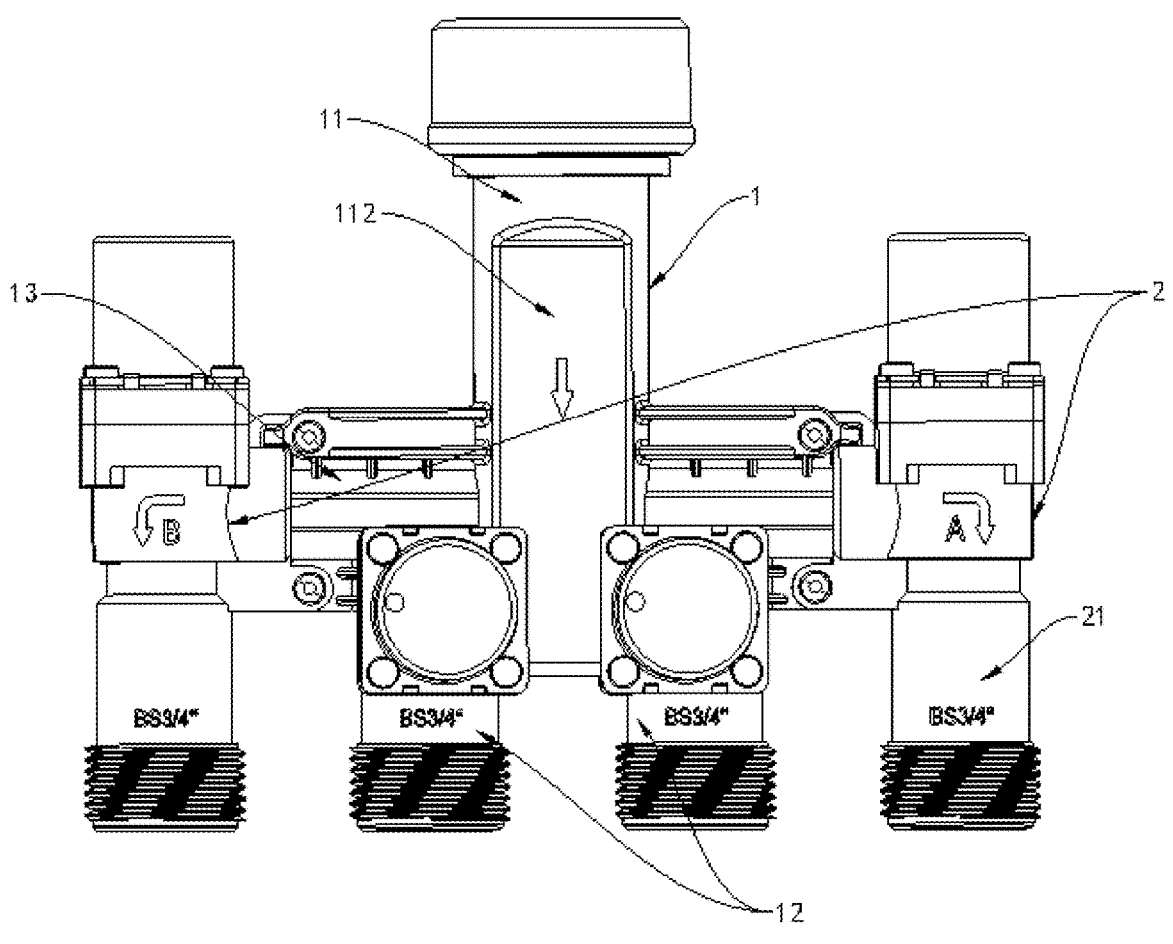
FIG. 1 is a schematic diagram of the structure according to the invention.
Figure 2:
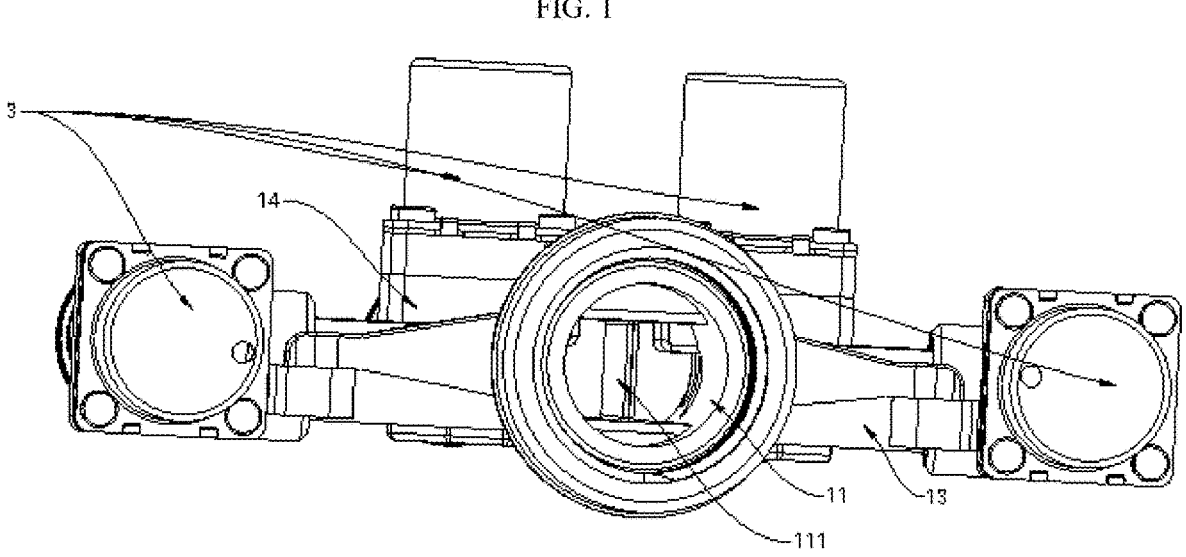
FIG. 2 is a schematic diagram of the structure of the separating rib according to the invention.
Figure 3:
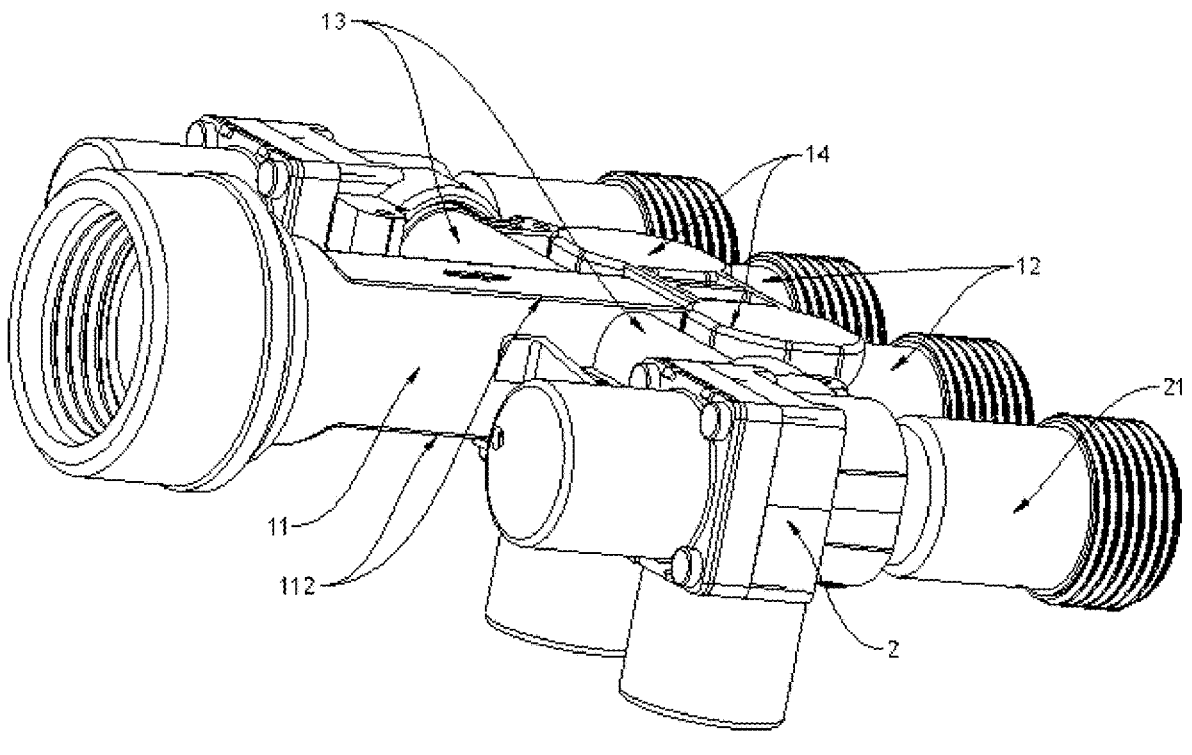
FIG. 3 is a side view according to the invention.
Figure 4:
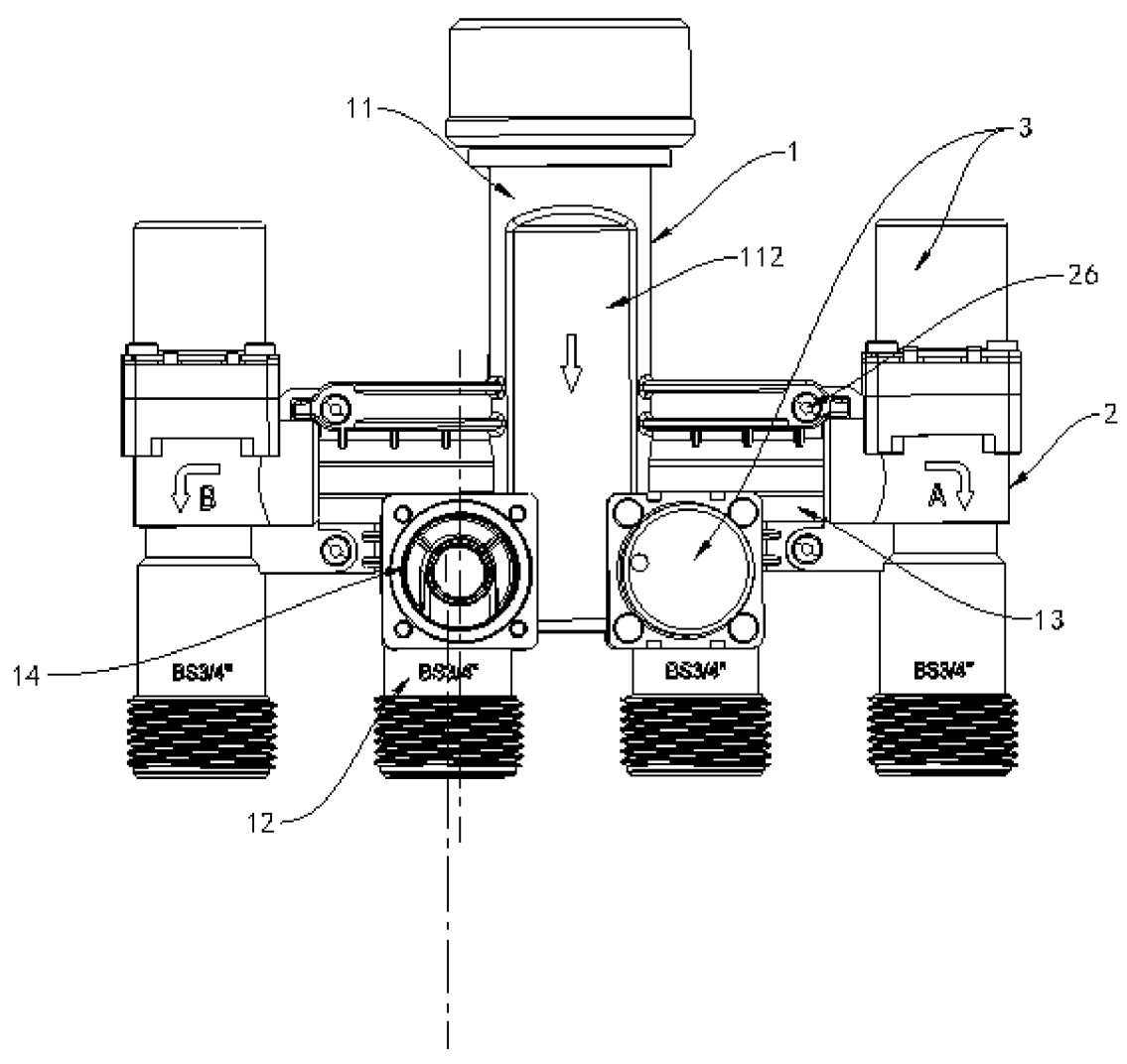
FIG. 4 is a front view of the structure of the first water outlet and the valve cavity according to the invention.

With reference to FIGS. 1-6, the invention discloses a one-to-four solenoid valve tube control structure, comprising a five-way pipe 1, wherein the five-way pipe 1 comprises a water inlet pipe 11, first water outlets 12 provided on both sides of one end of the water inlet pipe 11, and water distribution pipes 13 provided on both sides of the water inlet pipe 11; the water distribution pipe 13 is located above the first water outlet 12, and a top of the first water outlet 12 is provided with a valve cavity 14 eccentrically arranged therewith; an inside of the water inlet pipe 11 is provided with a separating rib 111 for separating the water distribution pipes 13 and the valve cavities 14 on both sides of the water inlet pipe 11; one end of the water distribution pipe 13 away from the water inlet pipe 11 is connected with a water outlet joint. The water inlet pipe 11 is directly connected to the two first water outlets 12, which reduces the size of the product, saves mold and production costs. The setting of the separating rib 111 separates the water flow into two streams to reduce the influence of the water flow on the two water distribution pipes 13 and the influence of the two valve cavities 14. With reference to FIG. 4, the water distribution pipe 13 is located above the first water outlet 12, which can effectively reduce the impact and mutual influence of water flow on the solenoid valve 3 on the valve cavity 14; moreover, the eccentric design allows the two first water outlets 12 to effectively install other joints, which is conducive to increasing the pressure of water outflow. The water inlet pipe 11 is not limited to being connected to only two first water outlets 12, but can also be connected to three, four or more water outlets to form six-way or seven-way pipes, etc.

Specifically, the water inlet pipe 11 is provided with a flattening part 112, and the number of the flattening part 112 is at least one. When there are two flattening parts 112, the flattening parts 112 on both sides of the water inlet pipe 11 are conducive to the installation of the internal structure, making the overall thickness of the product thinner, making it easier for customers to operate and install, and being more conducive to installation close to the wall or in a narrow space, making the installation easier.

Specifically, a top and bottom of the water distribution pipe 13 are respectively provided with a first connecting plate 15 and a second connecting plate 16, and the first connecting plate 15 and the second connecting plate 16 are both provided with a first connecting hole 17 inside.

Specifically, the first connecting plate 15 is provided with a first reinforcing rib 151 with one end fixed to the water inlet pipe 11 and a second reinforcing rib 152 with one end fixed to the water distribution pipe 13, and the second connecting plate 16 is provided with a third reinforcing rib 161 with one end fixed to the valve cavity 14; the setting of the first reinforcing rib 151, the second reinforcing rib 152, and the third reinforcing rib 161 is mainly to increase the structural strength of the product, to prevent the water distribution pipe 13, the valve cavity 14, and the water inlet pipe 11 from being impacted by water hammer and causing cracks in the joints, thereby making the product more durable.

Specifically, both a top of the water outlet joint 2 and the valve cavity 14 are provided with a solenoid valve 3, and the bottom of the water outlet joint 2 is provided with a second water outlet 21; the solenoid valve 3 is used to control the opening and closing of the first water outlet 12 and the second water outlet 21.

Figure 5:
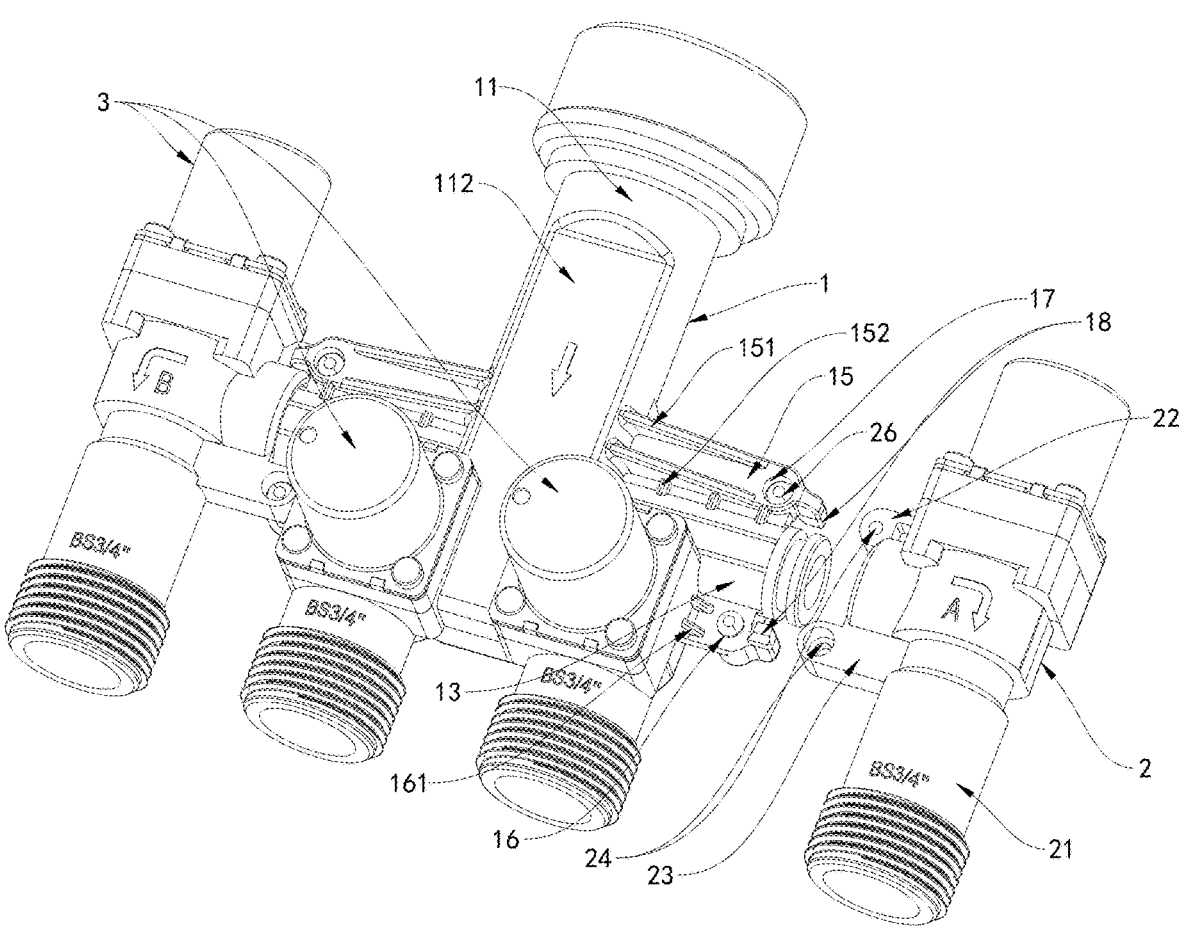
FIG. 5 is a schematic diagram according to the invention wherein the water outlet joint and the water distribution pipe are separated.
Figure 6:
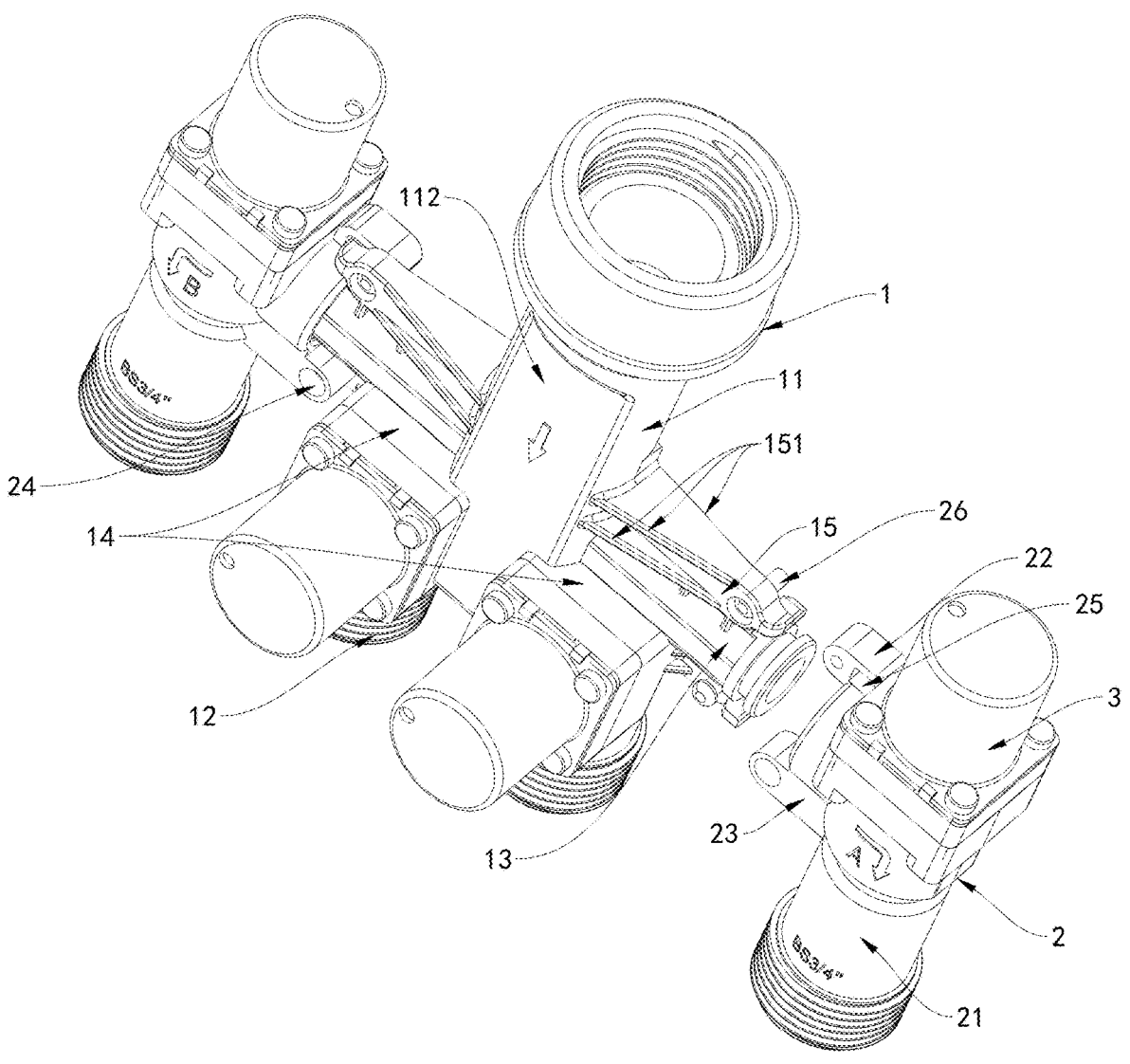
FIG. 6 is a schematic diagram according to the invention wherein the water outlet joint and the water distribution pipe are separated.

Specifically, a top and bottom of one side of the water outlet joint 2 are respectively provided with a first butt joint plate 22 and a second butt joint plate 23, and one end of the first butt joint plate 22 and the second butt joint plate 23 respectively extend to one side of the first connecting plate 15 and second the connecting plate 16; the first butt joint plate 22 and the second butt joint plate 23 are both provided with a second connecting hole 24; the second connecting hole 24 is coaxially arranged with the first connecting hole 17 on one side thereof, and a fastener 26 is jointly threaded inside the second connection hole 24 and the coaxial first connection hole 17; one end of the first connecting plate 15 and the second connecting plate 16 are respectively provided with protrusions 18 facing in opposite directions, and the interiors of the first butt joint plate 22 and the second butt joint plate 23 are respectively provided with grooves 25 facing in opposite directions; one end of the protrusion 18 is buckled into the interior of the corresponding groove 25. With reference to FIGS. 5 and 6, when installing the water outlet joint 2, the first butt joint plate 22, the second butt joint plate 23, the first connecting plate 15, and the second connecting plate 16 are staggered in a cross shape, and after the water outlet joint 2 is put on the water distribution pipe 13, rotate the water outlet joint 2, so that the protrusion 18 is buckled into the inside of the groove 25, and the first connecting hole 17 and the second connecting hole 24 are coaxially opposite to each other. Finally, fasten the first connecting hole 17 and the second connecting hole 24 by the fastener 26.

In summary, in the one-to-four solenoid valve tube control structure, the water inlet pipe 11 is directly connected to the two first water outlets 12, which maximizes the use of the five-way pipe 1 body space, meets the daily use needs of users, reduces the size of the product, saves mold and production costs, and the separating rib 111 separates the water flow into two streams to reduce the influence of the water flow on the pipelines on both sides of the water inlet pipe 11. The water distribution pipe 13 is located above the first water outlet 12, and with the separating rib 111, it can effectively reduce the impact of the water flow on the middle solenoid valve 3 and the mutual influence. The two first water outlets 12 are eccentric in opposite directions, which greatly increases the installation space on the two first water outlets 12.

In the one-to-four solenoid valve tube control structure, the flattened parts 112 on both sides of the water inlet pipe 11 are conducive to the installation of the internal structure, making the overall thickness of the product thinner, making it easier for customers to operate and install, and more conducive to installation close to the wall or in a small space, making the installation easier.

Although the embodiments of the invention have been shown and described, for those of ordinary skill in the art, it can be understood that various changes, modifications, and substitutions can be made to these embodiments without departing from the principle and spirit of the invention. The protection scope of the invention is defined by the appended claims and the equivalents thereof.

The invention claimed is:

1. A one-to-four solenoid valve tube control structure, comprising a five-way pipe, wherein the five-way pipe comprises a water inlet pipe, first water outlets provided on both sides of one end of the water inlet pipe, and water distribution pipes provided on both sides of the water inlet pipe; the water distribution pipe is located above the first water outlet, and a top of the first water outlet is provided with a valve cavity eccentrically arranged therewith; an inside of the water inlet pipe is provided with a separating rib for separating the water distribution pipes and the valve cavities on both sides of the water inlet pipe; one end of the water distribution pipe away from the water inlet pipe is connected with a water outlet joint.

2. The one-to-four solenoid valve tube control structure of claim 1, wherein the water inlet pipe is provided with at least one flattening part.

3. The one-to-four solenoid valve tube control structure of claim 1, wherein a top and bottom of the water distribution pipe are respectively provided with a first connecting plate and a second connecting plate, and the first connecting plate and the second connecting plate are both provided with a first connecting hole inside.

4. The one-to-four solenoid valve tube control structure of claim 3, wherein the first connecting plate is provided with a first reinforcing rib with one end fixed to the water inlet pipe and a second reinforcing rib with one end fixed to the water distribution pipe.

5. The one-to-four solenoid valve tube control structure of claim 3, wherein the second connecting plate is provided with a third reinforcing rib with one end fixed to the valve cavity.

6. The one-to-four solenoid valve tube control structure of claim 3, wherein a top and bottom of one side of the water outlet joint are respectively provided with a first butt joint plate and a second butt joint plate, and one end of the first butt joint plate and the second butt joint plate respectively extend to one side of the first connecting plate and second the connecting plate.

7. The one-to-four solenoid valve tube control structure of claim 6, wherein the first butt joint plate and the second butt joint plate are both provided with a second connecting hole; the second connecting hole is coaxially arranged with the first connecting hole on one side thereof, and a fastener is jointly threaded inside the second connection hole and the coaxial first connecting hole.

8. The one-to-four solenoid valve tube control structure of claim 7, wherein one end of the first connecting plate and the second connecting plate are respectively provided with protrusions facing in opposite directions, and the interiors of the first butt joint plate and the second butt joint plate are respectively provided with grooves facing in opposite directions; one end of the protrusion is buckled into the interior of the corresponding groove.

9. The one-to-four solenoid valve tube control structure of claim 1, wherein both a top of the water outlet joint and the valve cavity are provided with a solenoid valve, and the bottom of the water outlet joint is provided with a second water outlet.

* * * * *